US007424037B2

(12) United States Patent
Imazeki et al.

(10) Patent No.: US 7,424,037 B2
(45) Date of Patent: Sep. 9, 2008

(54) OTU FRAME DATA GENERATING APPARATUS AND METHOD IN WHICH MULTIFRAME STRUCTURED DATA TO BE INSERTED INTO OVERHEAD PORTION CAN BE EASILY EDITED

(75) Inventors: Hajime Imazeki, Isehara (JP); Koichi Kibe, Atsugi (JP)

(73) Assignee: Anritsu Corporation, Tokyo (JP)

( * ) Notice: Subject to any disclaimer, the term of this patent is extended or adjusted under 35 U.S.C. 154(b) by 718 days.

(21) Appl. No.: 10/887,393

(22) Filed: Jul. 7, 2004

(65) Prior Publication Data

US 2005/0013296 A1    Jan. 20, 2005

(30) Foreign Application Priority Data

Jul. 14, 2003    (JP)    ............................. 2003-196260

(51) Int. Cl.
*H04J 12/403*    (2006.01)
(52) U.S. Cl. ........................................ 370/474; 370/476
(58) Field of Classification Search ................. 370/389; 398/58; 709/250
See application file for complete search history.

(56) References Cited

U.S. PATENT DOCUMENTS

| 5,918,053 | A * | 6/1999 | Graham ..................... 717/127 |
| 7,039,725 | B1 * | 5/2006 | Player ......................... 709/250 |
| 2003/0120799 | A1 * | 6/2003 | Lahav et al. ................. 709/236 |

FOREIGN PATENT DOCUMENTS

JP    2001-201374 A    7/2001

OTHER PUBLICATIONS

Kaplan, F., "Ueberblick Ueber Die Itu-T-Empfehlung G-709" NTZ (Nachrichtentechnische Zeitschrift), VDE Verlag FMBH., Berlin, DE, vol. 44, No. 9, 2002, pp. 24-27, XP001125136, ISSN: 0948-728X.

Papadimitroiou, Alcatel, J. Et al., G.709 Encoding for Link Management Protocol (LMP) Test messages draft-papadimiliou-ccamp-lmp-test-g709-00.txt;IETF Standard-Working-Draft, Internet Engineering Task Force, IETF, CH, Oct. 2002, XP015004765, ISSN: 0000-0004.

ITU-T G.709/Y.1331; Series G: Transmission Systems and Media, Digital Systems and Networks; International Telecommunication Union: Feb. 2001.

* cited by examiner

*Primary Examiner*—Seema S. Rao
*Assistant Examiner*—Sai-Ming Chan
(74) *Attorney, Agent, or Firm*—Frishauf, Holtz, Goodman & Chick, P.C.

(57)    ABSTRACT

An overhead data generating unit stores and generates the non-multiframe structured data and the multiframe structured data to be inserted into the overhead portion of an OTU frame. The overhead data generating unit includes a memory which stores the multiframe structured data corresponding to sequence numbers in each multiframe unit of 256 frames (or the number of frames of ½ or ¼ thereof) from 0 to 255 which are needed for completing a set of meaningful data for each predetermined data item. An editing unit reads at least the multiframe structured data corresponding to the sequence numbers, and causes to list-display each multiframe in order of the sequence numbers to a display unit, and carries out editing processing in each multiframe unit with respect to the multiframe structured data in accordance with an arbitrary setting by an operating unit.

20 Claims, 9 Drawing Sheets

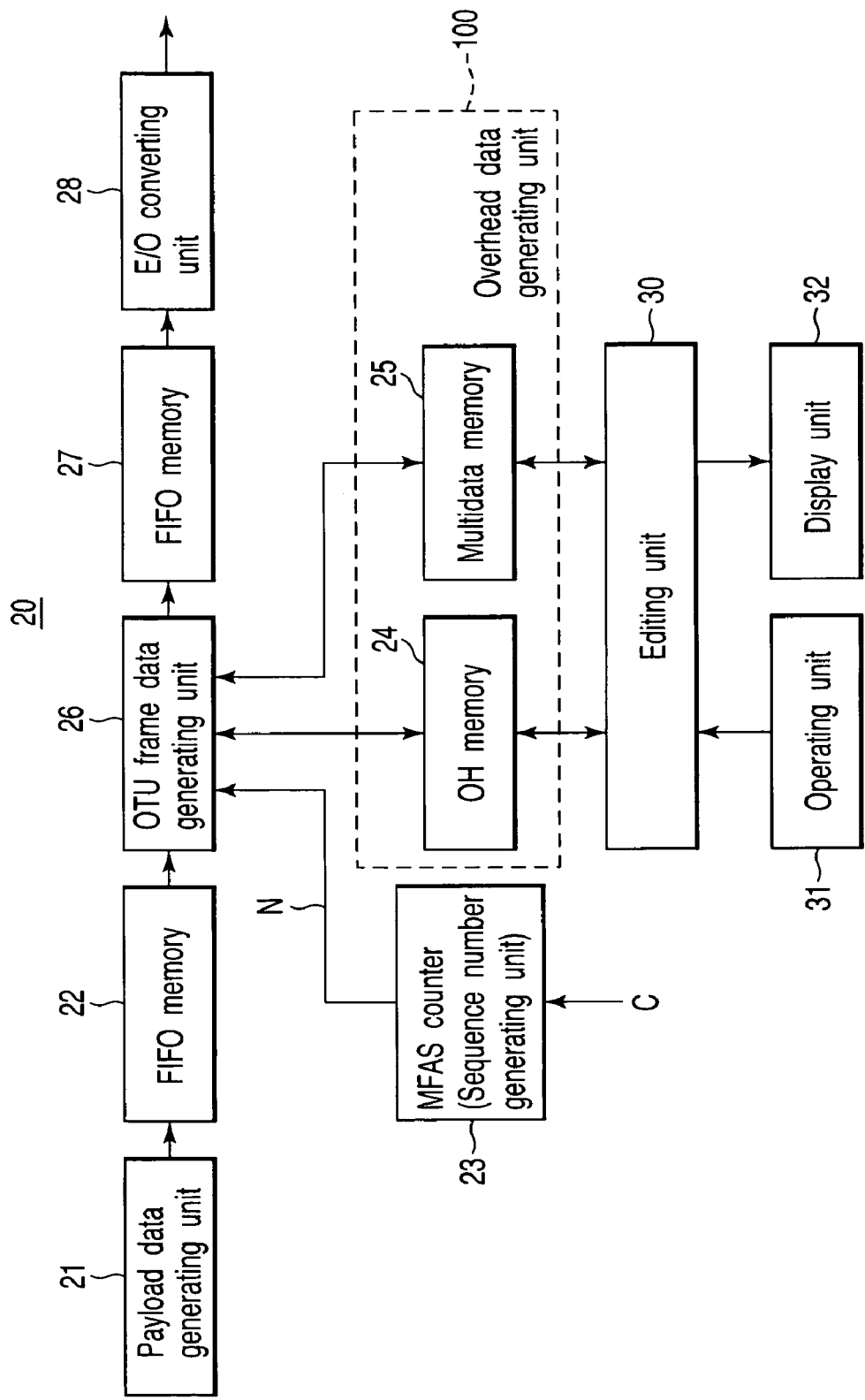
F I G. 1

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FAS | | | | | | MFAS | | SM | | GCC0 | | RES | RES | RES | JC |
| | F6 | F6 | F6 | 28 | 28 | 28 | ... | TTI | ... | 00 | 00 | 00 | 00 | 00 | 00 | ... |
| 2 | RES | | | TCM ACT | TCM2 | TCM6 | | TCM1 | TCM5 | | TCM4 | | FTFL | FTFL | |
| | 00 | 00 | 00 | 00 | TTI | ... | 00 | TTI | ... | 00 | TTI | ... | 00 | FTFL | 00 | JC ... |
| 3 | TCM3 | GCC1 | GCC2 | | | APS / PCC | | TCM1 | | | PM | | EXP | | RES | JC |
| | TTI | ... | 00 | TTI | ... | 00 | TTI | ... | 00 | TTI | ... | 00 | 00 | 00 | 00 | ... |
| 4 | GCC1 | | | | | | | | | | RES | | | | PSI | NJO |
| | 00 | 00 | 00 | 00 | 00 | 00 | 00 | 00 | 00 | 00 | 00 | 00 | 00 | 00 | PSI | ... |

F I G. 3

```
SM-TTI
  N
  0     SAPI [0]      All-0
 1-3    SAPI [1-3]    IS:CC         [JPN ▽]   [select ▽]
 4-15   SAPI [4-15]   NS:ICC,UAPC   [000000000000]

16     DAPI [0]      All-0
17-19   DAPI [1-3]    IS:CC         [JPN ▽]   [select ▽]
20-31   DAPI [4-15]   NS:ICC,UAPC   [000000000000]

Operator specific
                    00 01 02 03 04 05 06 07 08 09
              +00   00 00 00 00 00 00 00 00 00 00
32-63         +10   00 00 00 00 00 00 00 00 00 00
              +20   00 00 00 00 00 00 00 00 00 00
              +30   00 00

```
JPN     JAPAN
JOR     JORDAN
KAZ     KAZAKHSTAN
KEN     KENYA
KHM     CAMBODIA
KIR     KIRIBATI
KOR     KOREA,REPUBLIC OF
KWT     KUWAIT
```

FIG. 5

FTFL

| N | | | | | | | | | | | | | | | | | | | | | |
|---|---|---|---|---|---|---|---|---|---|---|---|---|---|---|---|---|---|---|---|---|---|
| 0 | FIF | Foward field ▽ | | | | | | | | | | | | | | | | | | | |
| 1-9 | OIF | 00 | No Fault | | | | | | | | | | | | | | | | | | |
| | CC | JPN ▽ | select ▽ | | | | | | | | | | | | | | | | | | |
| | NSC | 000000 | | | | | | | | | | | | | | | | | | | |
| 10-127 | Operator specific | | | | | | | | | | | | | | | | | | | | |
| | | 00 | 01 | 02 | 03 | 04 | 05 | 06 | 07 | 08 | 09 | 10 | 11 | 12 | 13 | 14 | 15 | 16 | 17 | 18 | 19 |
| | +00 | 00 | 00 | 00 | 00 | 00 | 00 | 00 | 00 | 00 | 00 | 00 | 00 | 00 | 00 | 00 | 00 | 00 | 00 | 00 | 00 |
| | +20 | 00 | 00 | 00 | 00 | 00 | 00 | 00 | 00 | 00 | 00 | 00 | 00 | 00 | 00 | 00 | 00 | 00 | 00 | 00 | 00 |
| | +40 | 00 | 00 | 00 | 00 | 00 | 00 | 00 | 00 | 00 | 00 | 00 | 00 | 00 | 00 | 00 | 00 | 00 | 00 | 00 | 00 |
| | +60 | 00 | 00 | 00 | 00 | 00 | 00 | 00 | 00 | 00 | 00 | 00 | 00 | 00 | 00 | 00 | 00 | 00 | 00 | 00 | 00 |
| | +80 | 00 | 00 | 00 | 00 | 00 | 00 | 00 | 00 | 00 | 00 | 00 | 00 | 00 | 00 | 00 | 00 | 00 | 00 | 00 | 00 |
| | +100 | 00 | 00 | 00 | 00 | 00 | 00 | 00 | 00 | 00 | 00 | 00 | 00 | 00 | 00 | 00 | 00 | 00 | | | |

| PSI N | 00 | 01 | 02 | 03 | 04 | 05 | 06 | 07 | 08 | 09 | 10 | 11 | 12 | 13 | 14 | 15 | 16 | 17 | 18 | 19 |
|---|---|---|---|---|---|---|---|---|---|---|---|---|---|---|---|---|---|---|---|---|
| +00 | 00 | 00 | 00 | 00 | 00 | 00 | 00 | 00 | 00 | 00 | 00 | 00 | 00 | 00 | 00 | 00 | 00 | 00 | 00 | 00 |
| +20 | 00 | 00 | 00 | 00 | 00 | 00 | 00 | 00 | 00 | 00 | 00 | 00 | 00 | 00 | 00 | 00 | 00 | 00 | 00 | 00 |
| +40 | 00 | 00 | 00 | 00 | 00 | 00 | 00 | 00 | 00 | 00 | 00 | 00 | 00 | 00 | 00 | 00 | 00 | 00 | 00 | 00 |
| +60 | 00 | 00 | 00 | 00 | 00 | 00 | 00 | 00 | 00 | 00 | 00 | 00 | 00 | 00 | 00 | 00 | 00 | 00 | 00 | 00 |
| +80 | 00 | 00 | 00 | 00 | 00 | 00 | 00 | 00 | 00 | 00 | 00 | 00 | 00 | 00 | 00 | 00 | 00 | 00 | 00 | 00 |
| +100 | 00 | 00 | 00 | 00 | 00 | 00 | 00 | 00 | 00 | 00 | 00 | 00 | 00 | 00 | 00 | 00 | 00 | 00 | 00 | 00 |
| +120 | 00 | 00 | 00 | 00 | 00 | 00 | 00 | 00 | 00 | 00 | 00 | 00 | 00 | 00 | 00 | 00 | 00 | 00 | 00 | 00 |
| +140 | 00 | 00 | 00 | 00 | 00 | 00 | 00 | 00 | 00 | 00 | 00 | 00 | 00 | 00 | 00 | 00 | 00 | 00 | 00 | 00 |
| +160 | 00 | 00 | 00 | 00 | 00 | 00 | 00 | 00 | 00 | 00 | 00 | 00 | 00 | 00 | 00 | 00 | 00 | 00 | 00 | 00 |
| +180 | 00 | 00 | 00 | 00 | 00 | 00 | 00 | 00 | 00 | 00 | 00 | 00 | 00 | 00 | 00 | 00 | 00 | 00 | 00 | 00 |
| +200 | 00 | 00 | 00 | 00 | 00 | 00 | 00 | 00 | 00 | 00 | 00 | 00 | 00 | 00 | 00 | 00 | 00 | 00 | 00 | 00 |
| +220 | 00 | 00 | 00 | 00 | 00 | 00 | 00 | 00 | 00 | 00 | 00 | 00 | 00 | 00 | 00 | 00 | 00 | 00 | 00 | 00 |
| +240 | 00 | 00 | 00 | 00 | 00 | 00 | 00 | 00 | 00 | 00 | 00 | 00 | 00 | 00 | 00 | | | | | |

0-255  PSI[0]:PT setting  00  Experimental Mapping  OK

FIG. 8

OTU FRAME DATA GENERATING APPARATUS AND METHOD IN WHICH MULTIFRAME STRUCTURED DATA TO BE INSERTED INTO OVERHEAD PORTION CAN BE EASILY EDITED

CROSS-REFERENCE TO RELATED APPLICATIONS

This application is based upon and claims the benefit of priority from prior Japanese Patent Application No. 2003-196260, filed Jul. 14, 2003, the entire contents of which are incorporated herein by reference.

BACKGROUND OF THE INVENTION

1. Field of the Invention

The present invention relates to an OTU frame data generating apparatus which generates and outputs OTU (OTU: Optical Channel Transport Unit) frame data for use in an optical transport network (OTN: Optical Transport Network), and in particular, to an OTU frame data generating apparatus and method using a technique in which multiframe structured data to be inserted into the overhead (OH: Overhead) portion thereof can be easily edited.

2. Description of the Related Art

In recent years, in addition to conventional various synchronous transmission systems SDH/SONET, PDH and ATM, or the like, an OTU frame structure for use in an optical transport network (OTN) in which various frames of these transmission systems are mapped and transmitted is regulated by ITU-T G.709.

The OTU frame is composed of an overhead portion (OH) of 4 row×16 column bytes and a payload portion of 4 row× 4064 column bytes including an FEC (Forward error Correction) region for correcting errors as shown in FIG. 9.

As shown in FIG. 10, various information needed for transmitting OTU frame data are inserted in the overhead portion (OH).

In FIG. 10, the data of 6-byte length "FAS: Frame Alignment Signal" in the first row is information expressing the top of the frame or the like.

The data of 1-byte length "MFAS: Multiframe Alignment Signal" following the "FAS" is sequence number (0 to 255) information denoting what number frame of the multiframe this frame is, as shown in FIG. 9.

Namely, because the "MFAS" is to form a set of meaningful data by combining data of 256 frames (or the number of frames of ½ or ¼ thereof) of the multiframe structured data which will be described later, the "MFAS" is to denote what number frame among the 256 frames the frame is by the sequence number.

In other words, a set of meaningful data is completed every 256 frames (or the number of frames of ½ or ¼ thereof).

Among the respective data following this "MFAS", respective "TTI: Transmitted Trace Identifier" data, which are denoted by applying oblique lines thereto and which include address information and the like, of "SM: Section Monitoring", "TCM6", "TCM5", . . . , "TCM1" (Tandem Connection Monitoring) in the second row and the third row, and "PM: Path Monitoring" following the "TCM1", "FTFL: Fault type and Fault Location reporting channel" data including field information "following TCM4" in the second row, and "PSI: Payload Structure Identifier" data including structural information in the fourth and fifteenth byte payload portion are respectively multiframe structured data of 1-byte length.

These multiframe structured data form a set of meaningful data by combining data of 256 frames (or the number of frames of ½ or ¼ thereof) as described above due to one byte being respectively allocated to each frame.

Further, the respective data other than the above-described data are respectively non-multiframe structured data which are respectively meaningful for each frame.

As these non-multiframe structured data, in addition to respective "BIP: Bit Interleaved Parity 8"s and respective "STATE"s of the above-described "SM", and "TCM6", "TCM5", . . . , and "TCM1", there are "GCC0 (General Communication Channel 0)", "RES (Reserved for future international standardization)", "JC (Justification Control)", "TCM ACT (Activation)", "EXP (Experimental)", "GCC1", "GCC2", "APS (Automatic Protection Switching)/PCC (Protection Communication Channel)", and "NJO (Negative Justification Opportunity)" data.

Note that "BEI (Backward Error Indication)" of 4 bits, "BDI (Backward Defect Indication)" and "IAE (Incoming Alignment Error" of respectively 1 bit, and "RES" of 2 bits are allocated to the above-described "STATE"s.

In this way, in particular, when transmitting equipment using OTU frame data having a frame structure in which multiframe structured data and non-multiframe structured data are mixed and inputted together into the overhead portion is constructed, it is necessary to test whether or not the information in the overhead portion is correctly recognized through each frame of the 256 frames (or the number of frames of ½ or ¼ thereof) from 0 to 255 which are needed for completing a set of meaningful data.

However, the conventional OTU frame data generating apparatus for this type of usage is constructed such that, with respect to each multiframe data information to be inserted into the overhead portion, only one set of data can be fixedly set through each multiframe of the 256 frames (or the number of frames of ½ or ¼ thereof) from 0 to 255 which are needed for completing a set of meaningful data.

Accordingly, in the prior art, because an apparatus for generating OTU frame data in which each multiframe data information to be inserted into the overhead portion can be arbitrarily set through each multiframe of the 256 frames (or the number of frames of ½ or ¼ thereof) from 0 to 255 which are needed for completing a set of meaningful frame data has been not realized, in particular, when transmitting equipment using OTU frame data having a frame structure in which multiframe structured data and non-multiframe structured data are mixed and inputted together into the overhead portion is constructed, there is the problem that it is impossible to test whether or not the information in the overhead portion is correctly recognized.

Therefore, in particular, when an OTU frame data generating apparatus for testing the transmitting equipment construction OTN is constructed, it has been strongly required that the OTU frame data generating apparatus which can generate OTU frame data in which each multiframe data information to be inserted into an overhead portion can be arbitrarily set through each multiframe of the 256 frames (or the number of frames of ½ or ¼ thereof) from 0 to 255 which are needed for completing a set of meaningful data is realized.

BRIEF SUMMARY OF THE INVENTION

An object of the present invention is to provide an OTU frame data generating apparatus and method which can generate OTU frame data in which each multiframe data information to be inserted into an overhead portion can be arbitrarily set through each multiframe of the 256 frames (or the number of frames of ½ or ¼ thereof) from 0 to 255 which are needed for completing a set of meaningful data, in particular, when an OTU frame data generating apparatus for testing the transmitting equipment construction OTN is constructed.

According to a first aspect of the present invention, there is provided an OTU frame data generating apparatus for generating Optical Channel Transport Unit (OTU) frame data having an overhead portion into which multiframe structured data and non-multiframe structured data are mixed and inserted together, and a payload portion following the overhead portion, in order to test transmitting equipment configuring an Optical Transport Network (OTN), the apparatus comprising:

a payload data generating unit (21) which generates payload data to be inserted into the payload portion of an OTU frame;

a sequence number generating unit (23) which successively outputs sequence numbers corresponding to the multiframe structured data among data to be inserted into the overhead portion of the OTU frame;

an overhead data generating unit (100) which stores and generates the non-multiframe structured data and the multiframe structured data to be inserted into the overhead portion of the OTU frame, the overhead data generating unit (100) including a memory (25) which stores the multiframe structured data to correspond to the sequence numbers output by the sequence number generating unit (23) in each multiframe unit for each predetermined data item;

an operating unit (31) in which data of 256 frames (or the number of frames of ½ or ¼ thereof) from 0 to 255 which are needed for completing a set of meaningful data for each predetermined data item allows to arbitrarily set, as an operation needed for editing of the multiframe structured data among the data to be inserted into the overhead portion of the OTU frame;

a display unit (32) which displays an editing process of the multiframe structured data among the data to be inserted into the overhead portion of the OTU frame;

an editing unit (30) which reads at least the multiframe structured data corresponding to the sequence numbers output by the sequence number generating unit (23), from the memory (25) of the overhead data generating unit (100), and causes to list-display each multiframe in order of the sequence numbers to the display unit (32), and which carries out editing processing in each multiframe unit with respect to the multiframe structured data, in accordance with an arbitrary setting by the operating unit (31);

an OTU frame data generating unit (26) which generates OTU frame data by inserting the multiframe structured data on which editing processing has been carried out in each multiframe unit by the editing unit (30), the non-multiframe structured data from the overhead data generating unit (100) and the sequence numbers corresponding to the multiframe structured data into the overhead portion of the OTU frame, and by inserting the payload data from the payload data generating unit (21) into the payload portion of the OTU frame; and an electric/optical (E/O) converting unit (28) which converts the OTU frame data generated by the OTU frame data generating unit (26) into an optical signal and outputs the optical signal.

According to a second aspect of the present invention, there is provided an OTU frame data generating apparatus according to the first aspect, wherein, when an overhead portion editing mode is specified by the operating unit (31), the editing unit (30) causes to display a basic screen for editing of a layout of the overhead portion of 4×16 bytes which construct the overhead portion of the OTU frame to the display unit (32), and on the basic screen, all of the data items to be inserted into the overhead portion of the OTU frame are displayed at positions corresponding to respective inserting positions, and with respect to the multiframe structured data, all of data items thereof are displayed at positions corresponding to respective inserting positions in a state of being selectable by an operation of the operating unit (31).

According to a third aspect of the present invention, there is provided an OTU frame data generating apparatus according to the second aspect, wherein the editing unit (30) causes to list-display to the display unit (32), as respective editing screens at least of "TTI" (Transmitted Trace Identifier) including access point information or the like, "FTFL" (Fault Type and Fault Location reporting channel) including field information, and "PSI" (Payload Structure Identifier) including structural information of the payload portion, in each multiframe unit and in order of the sequence numbers, data of 256 frames (or the number of frames of ½ or ¼ thereof) from 0 to 255 which are needed for completing a set of meaningful data, in accordance with the data item selected by the operating unit (31), and allows editing processing with respect to the multiframe structured data by the operating unit (31), thereby causing to update corresponding data stored in the memory (25) of the overhead data generating unit (100) based on results of the editing processing.

According to a fourth aspect of the present invention, there is provided an OTU frame data generating apparatus according to the third aspect, wherein, in a state in which the respective editing screens of the predetermined data items have been displayed on the display unit (32), the editing unit (30) causes to display to the display unit (32) detailed information corresponding to the respective editing screens of the predetermined data items in a pull-down manner in a state of being selectable by the operating unit (31).

According to a fifth aspect of the present invention, there is provided an OTU frame data generating apparatus according to the second aspect, wherein, when an editing screen of the "TTI" is specified as the predetermined data item by the operating unit (31), the editing unit (30) causes to list-display to the display unit (32) "SAPI" (Source Access Point Identifier) of 16 bytes relating to a source access point, "DAPI" (Destination Access Point Identifier) of 16 bytes relating to a destination point, data values currently set at the "SAPI" and the "DAPI", and arbitrary data of 32 bytes following those in order of the sequence numbers, and allows editing processing with respect to those data by the operating unit (31), thereby causing to update corresponding data stored in the memory (25) of the overhead data generating unit (100) based on results of the editing processing.

According to a sixth aspect of the present invention, there is provided an OTU frame data generating apparatus according to the fifth aspect, wherein, when a display column, in which "select" which is an item of "SAPI IS: CC (Country Code)" that designates a source access point country is displayed, is selected on the editing screen of the "TTI", the editing unit (30) causes to display to the display unit (32) selectable items of "CC" in a pull-down manner.

According to a seventh aspect of the present invention, there is provided an OTU frame data generating apparatus according to the third aspect, wherein, when an editing screen of the "FTFL" is specified as the predetermined data items by the operating unit (31), the editing unit (30) causes to list-display to the display unit (32) an editing screen of "Forward field" of the "FTFL" and an editing screen of "Backward field" of the "FTFL" in a state of being selectable by an operation of the operating unit (31).

According to an eighth aspect of the present invention, there is provided an OTU frame data generating apparatus according to the seventh aspect, wherein, when an editing screen of "Forward field" or "Backward field" of the "FTFL" is selected by the operating unit (31), the editing unit (30) causes to list-display to the display unit (32) respective items and data of "FIF (Fault Identifier Field)" in 0 or $128^{th}$ byte, "OIF (Operator Identifier Field)" in $1^{st}$ to $9^{th}$ or $129^{th}$ to $137^{th}$ byte, or the like, and following data of 118 bytes in $10^{th}$ to $127^{th}$ or $138^{th}$ to $255^{th}$ byte which can be arbitrarily set, in order of the sequence numbers, and allows editing processing with respect to those data by the operating unit (31), thereby causing to update corresponding data stored in the memory (25) of the overhead data generating unit (100) based on results of the editing processing.

According to a ninth aspect of the present invention, there is provided an OTU frame data generating apparatus according to the first aspect, wherein the editing unit (30) causes to update corresponding data stored in the memory (25) of the overhead data generating unit (100) based on results of the editing processing carried out in each multiframe unit with respect to the data.

According to a tenth aspect of the present invention, there is provided an OTU frame data generating apparatus according to the first aspect, wherein the overhead data generating unit (100) includes an overhead memory (24) which has stored the non-multiframe structured data to be inserted into the overhead portion of the OTU frame in advance.

According to an eleventh aspect of the present invention, there is provided an OTU frame data generating method for causing to generate Optical Channel Transport Unit (OTU) frame data having an overhead portion into which multiframe structured data and non-multiframe structured data are mixed and inserted together, and a payload portion following the overhead portion, in order to test transmitting equipment configuring an Optical Transport Network (OTN), the method comprising:

generating payload data to be inserted into the payload portion of an OTU frame;

successively outputting sequence numbers corresponding to the multiframe structured data among data to be inserted into the overhead portion of the OTU frame;

storing the non-multiframe structured data to be inserted into the overhead portion of the OTU frame in an overhead memory (24);

storing the multiframe structured data among the data to be inserted into the overhead portion of the OTU frame in a multidata memory (25) to correspond to the sequence numbers;

arbitrarily setting data of 256 frames (or the number of frames of ½ or ¼ thereof) from 0 to 255 which are needed for completing a set of meaningful data for each predetermined data item as multiframe data, as an operation needed for editing of the multiframe structured data among the data to be inserted into the overhead portion of the OTU frame;

reading the multiframe structured data corresponding to the sequence numbers from the multidata memory (25), in order of the sequence numbers, data of 256 frames (or the number of frames of ½ or ¼ thereof) from 0 to 255 which are needed for completing a set of meaningful data for each predetermined data item in accordance with the arbitrary setting and list-displaying those to a displaying unit (32);

carrying out editing processing in accordance with an operation of a operation unit (31), in each multiframe unit with respect to the multiframe structured data and re-storing those in the multidata memory (25);

generating OTU frame data by inserting the multiframe structured data on which editing processing has been carried out in each multiframe unit, the non-multiframe structured data read from the overhead memory (24) and the sequence numbers corresponding to the multiframe structured data into the overhead portion of the OTU frame, and by inserting the payload data into the payload portion of the OTU frame; and converting the generated OTU frame data into an optical signal and outputting the optical signal.

According to a twelfth aspect of the present invention, there is provided an OTU frame data generating method according to the eleventh aspect, wherein, when an overhead portion editing mode is specified, the editing processing causes to display a basic screen for editing of a layout of the overhead portion of 4×16 bytes which configure the overhead portion of the OTU frame, and on the basic screen, all of the data items to be inserted into the overhead portion of the OTU frame are displayed at positions corresponding to respective inserting positions, and with respect to the respective multiframe structured data, all of data items thereof are displayed at positions corresponding to respective inserting positions in a state of being selectable in accordance with an operation of an operation unit (31).

According to a thirteenth aspect of the present invention, there is provided an OTU frame data generating method according to the twelfth aspect, wherein the editing processing comprises:

reading, by selecting the predetermined data items with the operation unit (31), at least respective editing screens of "TTI" (Transmitted Trace Identifier) including access point information and the like, "FTFL" (Fault Type and Fault Location reporting channel) including field information, and "PSI" (Payload Structure Identifier) including structural information of the payload portion in data unit of 256 frames (or the number of frames of ½ or ¼ thereof) which are needed for completing a set of meaningful data for respective editing screens, from the multidata memory (25);

causing to list-display those to the display section in order of the sequence numbers;

making editing processing with respect to the selected multiframe structured data by the operation unit (31); and causing to update corresponding data stored in the multidata memory (25) based on results of the editing processing.

According to a fourteenth aspect of the present invention, there is provided an OTU frame data generating method according to the thirteenth aspect, wherein, in a state in which the respective editing screens of the predetermined data items have been displayed, the editing processing causes to display detailed information displayed in the respective editing screens of the predetermined data items in a pull-down manner in a state of being selectable.

According to a fifteenth aspect of the present invention, there is provided an OTU frame data generating method according to the twelfth aspect, wherein, when an editing screen of the "TTI" is specified as the predetermined data items, the editing processing causes to list-display "SAPI" (Source Access Point Identifier) of 16 bytes relating to a source access point, "DAPI" (Destination Access Point Identifier) of 16 bytes relating to a destination point, data values currently set at the "SAPI" and the "DAPI", and arbitrary data of 32 bytes following those in order of the sequence numbers, and allows editing processing with respect to those data, thereby causing to update corresponding data stored in the memory (25) based on results of the editing processing.

According to a sixteenth aspect of the present invention, there is provided an OTU frame data generating method according to the fifteenth aspect, wherein, when a "select" in an item of "SAPI IS: CC (Country Code)", is selected on the editing screen of the "TTI", the editing processing causes to display selectable items of "CC" in a pull-down manner.

According to a seventeenth aspect of the present invention, there is provided an OTU frame data generating method according to the thirteenth aspect, wherein, when an editing screen of the "FTFL" is specified as the predetermined data item, the editing processing causes to display an editing screen of "Forward field" of the "FTFL" and an editing screen of "Backward field" of the "FTFL" in a state of being selectable.

According to an eighteenth aspect of the present invention, there is provided an OTU frame data generating method according to the seventeenth aspect, wherein, when an editing screen of "Forward field" or "Backward field" of the "FTFL" is selected, the editing processing causes to list-display respective items and data of "FIF (Fault Identifier Field)" in 0 or $128^{th}$ byte, "OIF (Operator Identifier Field)" in $1^{st}$ to $9^{th}$ or $129^{th}$ to $137^{th}$ byte, or the like, and following data of 118 bytes in $10^{th}$ to $127^{th}$ or $138^{th}$ to $255^{th}$ byte which can be arbitrarily set in order of the sequence numbers, and allows editing processing with respect to those data, thereby causing to update corresponding data stored in the memory (25) based on results of the editing processing.

According to a nineteenth aspect of the present invention, there is provided an OTU frame data generating method according to the eleventh aspect, wherein the editing processing causes to update corresponding data stored in the memory (25) based on results of the editing processing carried out in each multiframe unit with respect to the data.

According to a twentieth aspect of the present invention, there is provided an OTU frame data generating method according to the eleventh aspect, wherein the storing of the non-multiframe structured data is carried out by storing the non-multiframe structured data in advance in the overhead memory (24).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram for explaining a structure of one embodiment of an OTU frame data generating apparatus according to the present invention;

FIG. 3 is a screen of a display for explaining editing operation of the OTU frame data generating apparatus of FIG. 1;

FIG. 4 is a screen of the display for explaining editing operation of the OTU frame data generating apparatus of FIG. 1;

FIG. 5 is a screen of the display for explaining editing operation of the OTU frame data generating apparatus of FIG. 1;

FIG. 6 is a screen of the display for explaining editing operation of the OTU frame data generating apparatus of FIG. 1;

FIG. 7 is a screen of the display for explaining editing operation of the OTU frame data generating apparatus of FIG. 1;

FIG. 8 is a screen of the display for explaining editing operation of the OTU frame data generating apparatus of FIG. 1;

DETAILED DESCRIPTION OF THE INVENTION

Figure 2:
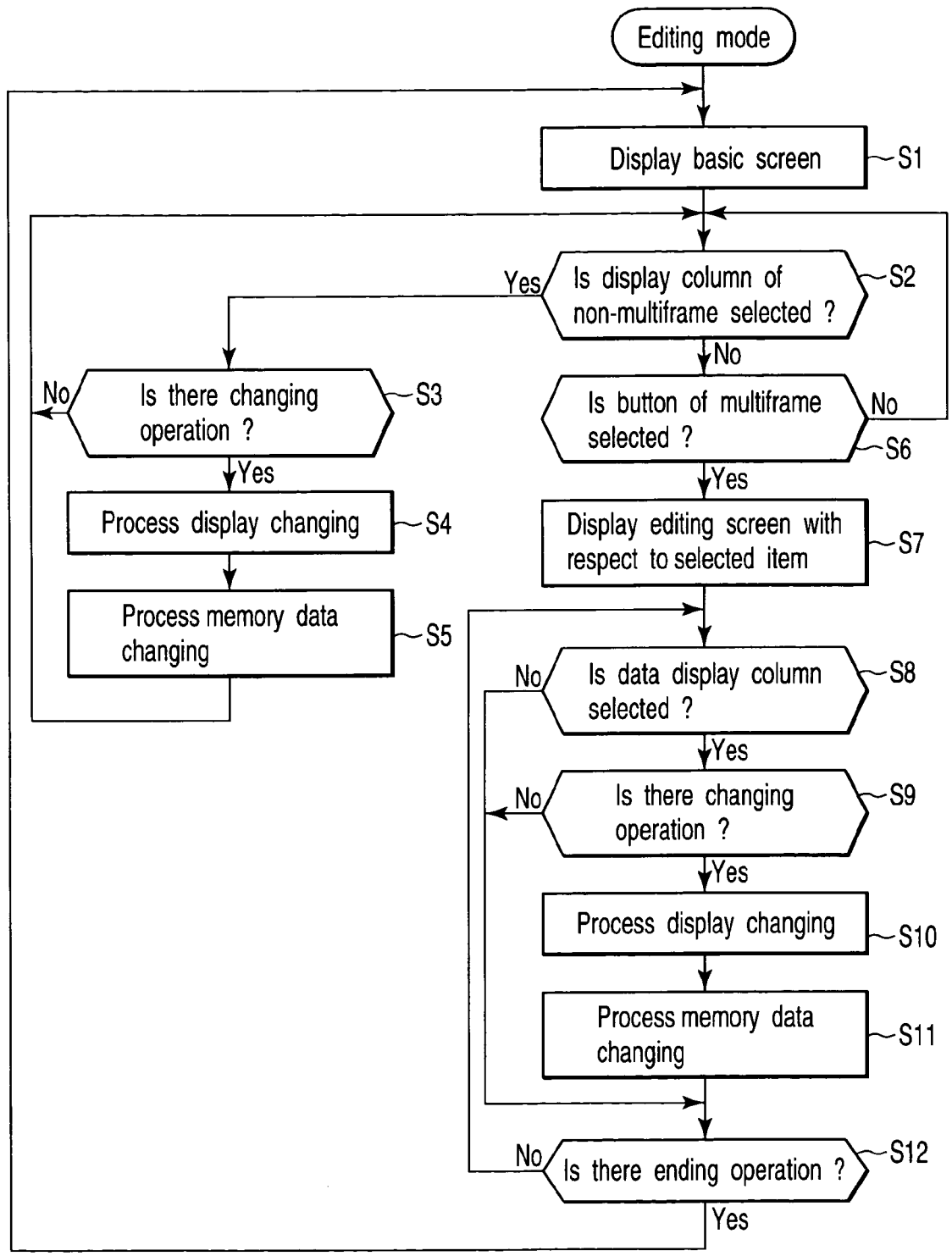
FIG. 2 is a flowchart for explaining the procedure of processing of a main portion of the OTU frame data generating apparatus of FIG. 1.
Figure 9:
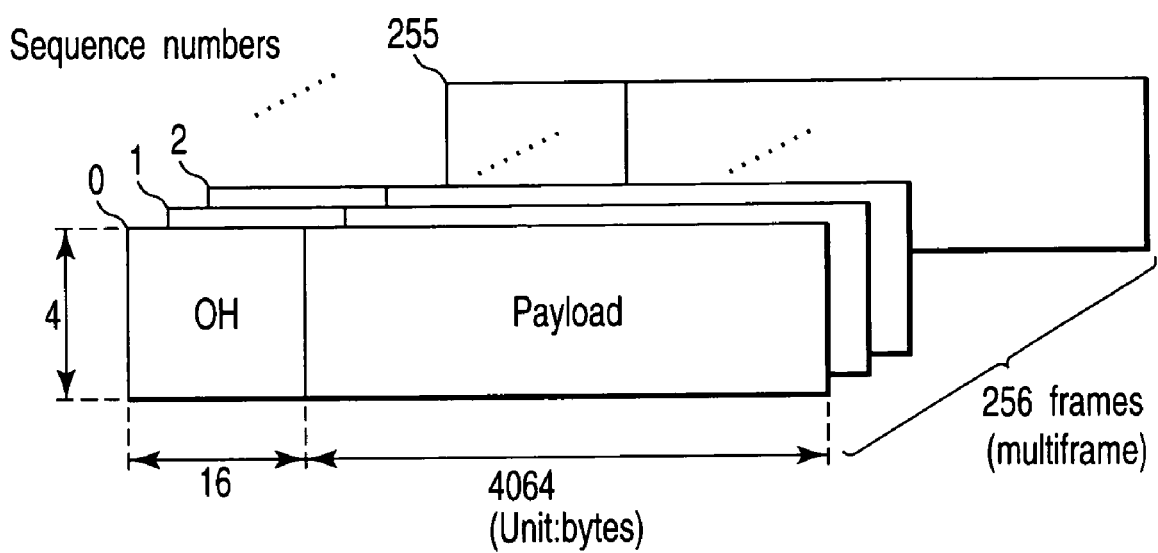
FIG. 9 is a diagram for explaining an entire structure of an OTU frame.
Figure 10:
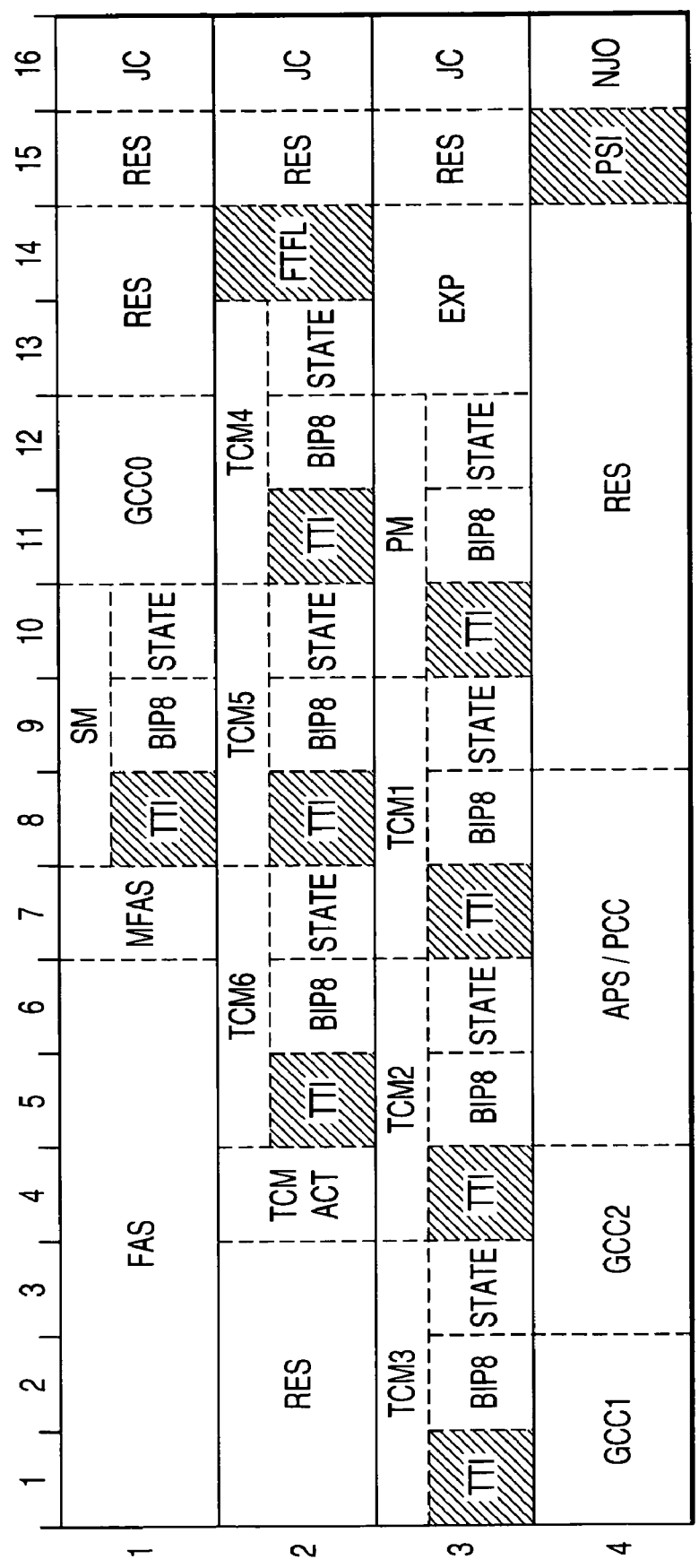
FIG. 10 is a diagram for explaining a structure of an overhead portion of the OTU frame.

Reference will now be made in detail to the presently preferred embodiments of the invention as illustrated in the accompanying drawings, in which like reference numerals designate like or corresponding parts.

Hereinafter, an embodiment of an OTU frame data generating apparatus according to the present invention will be described with reference to the drawings.

FIG. 1 is a block diagram for explaining a structure of an OTU frame data generating apparatus 20 applied as the embodiment according to the present invention.

The OTU frame data generating apparatus 20 is an OTU frame data generating apparatus for generating Optical Channel Transport Unit (OTU) frame data having an overhead portion in which multiframe structured data and non-multiframe structured data are mixed and inserted together and a payload portion following the overhead portion, in order to test a transmitting equipment configuring an Optical Transport Network (OTN).

The OTU frame data generating apparatus 20 includes a payload data generating unit 21 which generates payload data to be inserted into the payload portion of an OTU frame, a sequence number generating unit 23 which successively outputs sequence numbers corresponding to the multiframe structured data among the data to be inserted into the overhead portion of the OTU frame, and an overhead data generating unit 100 which stores and generates the non-multiframe structured data and the multiframe structured data which are to be inserted into the overhead portion of the OTU frame.

The overhead data generating unit 100 includes a memory corresponding to a multidata memory 25 which will be described later and in which the multiframe structured data are stored in advance to correspond to the sequence numbers output by the sequence number generating unit 23 in each multiframe unit for each predetermined data item.

Further, the OTU frame data generating apparatus 20 includes an operating unit 31, a display unit 32, an editing unit 30, an OTU frame data generating unit 26, and an electric/optical (E/O) converting unit 28.

In the operating unit 31, predetermined data items and data needed for completing a set of meaningful data for each predetermined data item allows to arbitrarily set, as an operation needed for editing of the multiframe structured data among the data to be inserted into the overhead portion of the OTU frame.

The display unit 32 displays an editing process of the multiframe structured data in accordance with an arbitrary setting by the operating unit 31 among the data to be inserted into the overhead portion of the OTU frame.

The editing unit 30 reads at least the multiframe structured data corresponding to the sequence numbers output by the sequence number generating unit 23 from the memory 25 of the overhead data generating unit 100 and causes to display each multiframe in order of the sequence numbers to the display unit 32, and carries out editing processing in a unit of multiframe with respect to the multiframe structured data.

The OTU frame data generating unit 26 generates OTU frame data by inserting the multiframe structured data on which editing processing has been carried out in a unit of multiframe by the editing unit 30, the non-multiframe structured data from the overhead data generating unit 100 and the sequence numbers corresponding to the multiframe structured data into the overhead portion of the OTU frame, and by inserting the payload data from the payload data generating unit 21 into the payload portion of the OTU frame.

The E/O converting unit 28 converts the OTU frame data generated by the OTU frame data generating unit 26 into an optical signal and outputs the optical signal.

In FIG. 1, the payload data generating unit 21 generates arbitrary frame data (for example, such as SDH/SONET, PDH, ATM, or the like described above) for being inserted into the payload portion of the OTU frame data for use in various synchronous transmission systems, and outputs those to a first-in first-out (FIFO) memory 22.

An MFAS (Multiframe Alignment Signal) counter 23 configures the sequence number generating unit of the present embodiment, and is composed of a counter of 8 bits. The MFAS counter 23 counts clock signals C in a period of the frames of OTU, and cyclically outputs the counted results from 0 to 255 as the sequence numbers N.

The OH (Overhead) memory 24 configures a first memory of the present embodiment, and respective data of "FAS", "GCC0, GCC1, GCC2", "TCM ACT", "APS/PCC", "RES", and the like such as described above as the non-multiframe structured data, among the data to be inserted into the overhead portion of the OTU frame have been stored in advance therein.

Further, the multidata memory 25 configures a second memory of the present embodiment, and the data of respective "TTI"s of "SM", "TCM6", "TCM5", . . . , and "TCM1", and "PM", and the respective data of "FTFL" and "PSI" such as described above as the multiframe structured data among the data to be inserted into the overhead portion of the OTU frame have been stored in advance therein.

The OTU frame data generating unit 26 generates the overhead portion of the OTU frame by using the non-multiframe structured data stored in the OH memory 24, the multiframe structured data stored in the multidata memory 25 or the multiframe structured data updated based on the results of the editing by the editing unit 30 which will be described later, and a sequence number N output the MFAS counter 23, reads payload data from the FIFO memory 22 out to the payload portion following the overhead portion, and generates OTU frame data, thereby outputting it to the FIFO memory 27.

Note that, the OTU frame data generating unit 26 inserts the data of the all items of the non-multiframe structured data stored into the OH memory 24 into the respective positions of the overhead portion of all of the multiframes.

Further, the OTU frame data generating unit 26 reads data of an order denoted by a sequence number N one-byte by one-byte from the data having plural number byte length with respect to each item of the multiframe structured data stored in the multidata memory 25 or the multiframe structured data updated based on the results of the editing by the editing unit 30 which will be described later, and inserts those into the respective positions of respective multiframes.

The E/O converting unit 28 successively reads the OTU frame data written in the FIFO memory 27, and converts those into an optical signal and outputs the optical signal.

The contents of the OH memory 24 and the multidata memory 25 can be edited by the editing unit 30.

The editing unit 30 causes to display a screen for setting of the overhead portion on the screen of the display unit 32 when an editing mode is specified by an operation of the operating unit 31 or the like, and carries out editing process such as setting, changing, and the like of respective data in the overhead portion in accordance with an operation of the operating unit 31.

FIG. 2 is a flowchart for explaining the procedure of the editing processing by the editing unit 30.

Hereinafter, the editing operation by the editing unit 30 will be described based on the flowchart.

When the overhead portion editing mode is specified, as shown in FIG. 3, the editing unit 30 causes to display to the display 32 a basic screen for editing constructed of a layout of the overhead portion of 4×16 bytes including the OH of the OTU frame (step S1).

On this basic screen for editing, all of the data items to be inserted into the overhead portion and the non-multiframe structured data values stored in the OH memory 24 are displayed at the positions into which the data are respectively inserted, and the respective multiframe structured data are displayed in a state in which the data items thereof (TTI or the like) can be selected by a pointing operation of the operating unit 31 or the like, for example, by buttons selected by a click-operation (portions to which hatchings are applied in FIG. 3) (Basic screen displaying step).

Further, when a selecting operation for one of the display columns (rectangular frames) of the non-multiframe structured data is carried out on the basic screen for editing by the operating unit 31 (step S2), the editing unit 30 allows in a state in which it is possible to change the data values which have been displayed on the display column of the display unit 32.

Further, when a changing operation for the data value which has been displayed on the display column is carried out by the operating unit 31 (step S3), the editing unit 30 carries out processing of changing display of the data value in the display column of the display unit 32 (step S4), and carries out processing of updating the OH memory 24 with respect to the changed data (step S5).

Further, when a selecting operation for one of the buttons (items) of the multiframe structured data is carried out on the basic screen for editing by the operating unit 31 (step S6), the editing unit 30 reads the data of the data item corresponding to the button from the multidata memory 25, and causes to display an editing screen corresponding to the data item to the display unit 32 (step S7: Editing screen displaying step).

Note that the displaying of the editing screen may be any of forms in which the editing screen is displayed so as to be superposed on the basic screen and in which the displaying of the basic screen is temporarily stopped and only the editing screen is individually displayed.

For example, the button of the "TTI" of "SM" is selectively operated on the basic screen for editing, as shown in FIG. 4, the breakdowns of the data transmitted in plural frames in a region at which the "TTI" of "SM" has been stored (in FIG. 4, "SAPI (Source Access Point Identifier)" of 16 bytes relating to a source access point, "DAPI (Destination Access Point Identifier)" of 16 bytes relating to a destination point, or the like), and the current set data value which has been set for each breakdown and the data of 32 bytes following it which can be arbitrarily set are list-displayed in order of the sequence numbers (in order of transmitted frames).

Note that, as shown in FIG. 4, because the total data length of "TTI" is 64 bytes, all of the data can be transmitted by inserting 1 byte into each of the 64 frames.

In this case, because the total number expressed by MFAS (1 byte) of the overhead portion of the OTU frame is 256 as described above, and the 256 frames are made to be one period, in a practical manner, the data of "TTI" of 64 bytes are repeatedly transmitted four times.

Further, here, the data which can be edited are displayed in the display columns which can be operated by pointing at the operating unit 31.

Then, when an operation of selecting a data display column for one of the display columns is carried out (step S8), the editing unit 30 is made to be in a state in which it is possible to change the data value which has been displayed on the display column.

Further, when the data value displayed on the display column is changed by the operating unit 31 (step S9), the editing unit 30 carries out display changing processing of the data value of the display column (step S10), and carried out processing of updating the multidata memory 25 with respect to the data.

For example, on the editing screen in FIG. 4, when "select" of the item of "SAPI IS (International Segment): CC (Country Code)" which designates a source access point country is selected, selectable items such as "CC" is displayed in a pull-down manner (not shown).

Here, supposing that "CC" is selectively operated, the list of the names and the codes of the selectable countries is displayed as shown in FIG. 5.

Then, when an arbitrary country from thereamong is selected, the code of the selected country is displayed in place of "JPN" which was displayed in the display column of a current set country, and the data stored in the multidata memory 25 are updated with respect to the "TTI" of "SM" in accordance with the change of the country.

Further, when "ASCII" is selected, and it is possible to input a code of a country by ASCII codes.

Further, the display columns of "SAPI NS (National Segment): ICC (ITU Carrier Code), UAPC (Unique Access Point Code)" are allowed to edit code data relating to a unique access point code systematized of an ITU carrier code or the like allocated to a network provider.

Note that the editing processing for the country codes, the ICC, the UAPC, or the like can be carried out in the same way with respect to the items of "DAPI IS: CC", "DAPI NS: ICC, UACP" of the destination point as well.

Further, when the button of "FTFL" is selected on the basic screen for editing is selected, as shown in FIGS. 6 and 7, a selecting column for selecting the field of "Forward field" or "Backward field", the respective items and data of "FIF (Fault Identifier Field)" in 0 or $128^{th}$ byte, "OIF (Operator Identifier Field) CC, NSC (National Segment Code)" in $1^{st}$ to $9^{th}$ or $129^{th}$ to $137^{th}$ byte, and the following data of 118 bytes in $10^{th}$ to $127^{th}$ byte or $138^{th}$ to $255^{th}$ byte which can be arbitrarily set are list-displayed in order of the sequence numbers, and editing for the data can be carried out in the same way as in the above description, and the data stored in the multidata memory 25 are updated based on the edited result.

Further, when the button of "PSI" is selectively operated on the basic screen for editing, as shown in FIG. 8, the editing screen on which the PSI data of 256 bytes have been list-displayed is displayed, and it is possible to edit with respect to the PT (Payload Type) setting data in the same way as in the above description, so that the data stored in the multidata memory 25 are updated based on the edited result.

After the editing processing for the multiframe structured data has been carried out in this way, when an operation of ending the editing (an operation of "OK" button of each editing screen in the above-described example) is carried out, the display screen returns to the state of displaying the basic screen for editing again (step S12).

Further, when the operation of ending the overhead editing is carried out by the operating unit 31 in this state of displaying the basic screen, the editing mode with respect to the overhead portion is completed.

In this way, when the non-multiframe structured data and the multiframe structured data to be inserted into the overhead portion are edited, and the contents of the OH memory 24 and the multidata memory 25 are updated, whereby a transmitting mode of the OTU frame data is specified, OTU frame data composed of an overhead portion and a payload portion generated based on the updated data are successively generated, and are finally converted into an optical signal at the E/O converting unit 28 to be outputted.

Because the OTU frame data generating apparatus 20 of the present embodiment is constructed as described above, the OTU frame data generating apparatus 20 can generate and output OTU frame data which can be arbitrarily set and changed for each item of the non-multiframe structured data and the multiframe structured data to be inserted into the overhead portion, and can easily and exactly carry out the performance tests for various transmitting equipment using OTU frame data.

Further, with respect to the multiframe structured data to be inserted into the overhead portion, because the editing unit 30 can edit by list-displaying the multiframe structured data in order of the sequence numbers for each item arbitrarily selected from the basic screen corresponding to the layout of each data in the entire overhead portion, the user can intuitively and easily grasp the multiframe structured data on the display screen, and can easily carry out the editing thereof.

Note that, in the OTU frame data generating apparatus 20 of the above-described embodiment, it is structure such that the non-multiframe structured data can be edited as well. However, it may be constructed such that the non-multiframe structured data are made to be fixed values, and only the multiframe structured data can be constructed.

As described above, the OTU frame data generating apparatus of the present invention has a payload data generating unit which outputs data for being inserted into a payload portion of an OTU frame, a sequence number generating unit which successively outputs sequence numbers of multiframes, a first memory having stored therein non-multiframe structured data among data to be inserted into an overhead portion of the OTU frame, a second memory having stored therein multiframe structured data, an OTU frame data generating unit which reads data corresponding to a sequence number outputted from the sequence number generating unit from the second memory, stores the read data and the sequence number, and the data stored in the first memory into the header of the OTU frame, and inserts the payload data outputted from the payload data generating unit into the payload portion, thereby generating the OTU frame data, an E/O converting unit which converts the OTU frame data into an optical signal and outputs it, an operating unit, a display, and an editing unit which list-displays at least the data stored in the second memory for each item on the display, and carries out editing processing in a unit of multiframe with respect to the data item in accordance with an operation at the operating unit.

Therefore, with respect to at least the multiframe structured data in the overhead portion, OTU frame data which can be arbitrarily set and changed for each item can be generated and outputted, and the performance tests for various transmitting equipment using OTU frame data can be easily carried out.

Moreover, with respect to the multiframe structured data to be inserted into the overhead portion, because the data can be edited by list-displaying the multiframe structured data in order of the sequence numbers for each item arbitrarily selected on the basic screen corresponding to the layout of each data of the entire overhead portion, the user can intuitively and easily grasp the multiframe structured data on the screen, and can easily carry out the editing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OTU frame data generating apparatus for generating Optical Channel Transport Unit (OTU) frame data having an overhead portion into which multiframe structured data and non-multiframe structured data are mixed and inserted together, and a payload portion following the overhead portion, wherein said OTU frame data generating apparatus is adapted to test transmitting equipment configuring an Optical Transport Network (OTN), the OTU frame data generating apparatus comprising:

a payload data generating unit which generates payload data to be inserted into the payload portion of an OTU frame;

a sequence number generating unit which successively outputs sequence numbers corresponding to the multiframe structured data among data to be inserted into the overhead portion of the OTU frame;

an overhead data generating unit which stores and generates the non-multiframe structured data and the multiframe structured data to be inserted into the overhead portion of the OTU frame, the overhead data generating unit including a memory which stores the multiframe structured data, in correspondence with the sequence numbers output by the sequence number generating unit, in each multiframe unit for each predetermined data item;

an operating unit which allows, for each predetermined data item, data of up to 256 frames to be arbitrarily set, as an operation needed for editing of the multiframe structured data among the data to be inserted into the overhead portion of the OTU frame;

a display unit which displays an editing process of the multiframe structured data;

an editing unit which reads at least the multiframe structured data in correspondence with the sequence numbers output by the sequence number generating unit, from the memory of the overhead data generating unit, causes to list-display each multiframe unit of the multiframe structured data in order of the sequence numbers on the display unit, and carries out editing processing in a multiframe unit of the multiframe structured data, in accordance with the arbitrary setting by the operating unit;

an OTU frame data generating unit which generates OTU frame data by inserting the multiframe structured data on which editing processing has been carried out by the editing unit, the non-multiframe structured data from the overhead data generating unit and the sequence numbers corresponding to the multiframe structured data into the overhead portion of the OTU frame, and by inserting the payload data from the payload data generating unit into the payload portion of the OTU frame; and an electric/optical (E/O) converting unit which converts the OTU frame data generated by the OTU frame data generating unit into an optical signal and outputs the optical signal;

wherein, when an overhead portion editing mode is specified by the operating unit, the editing unit causes a basic screen to be displayed on the display unit for editing of a layout of the overhead portion of 4×16 bytes which configures the overhead portion of the OTU frame, and on the basic screen, each of the predetermined data items to be inserted into the overhead portion of the OTU frame are displayed at positions corresponding to respective inserting positions; and wherein each of the predetermined data items of the multiframe structured data are displayed at positions corresponding to respective inserting positions in a state of being selectable by an operation of the operating unit.

2. An OTU frame data generating apparatus according to claim 1, wherein the editing unit causes to list-display on the display unit, as respective editing screens at least of "TTI" (Transmitted Trace Identifier) including access point information, "FTFL" (Fault Type and Fault Location reporting channel) including field information, and "PSI" (Payload Structure Identifier) including structural information of the payload portion, for each multiframe unit of the multiframe structured data in order of the sequence numbers, data of up to 256 frames, in accordance with a data item selected by the operating unit, and wherein the editing unit allows editing processing with respect to the multiframe structured data by the operating unit, thereby causing to update corresponding data stored in the memory of the overhead data generating unit based on results of the editing processing.

3. An OTU frame data generating apparatus according to claim 2, wherein, in a state in which the respective editing screens of the predetermined data items have been displayed on the display unit, the editing unit causes to display on the display unit detailed information corresponding to the respective editing screens of the predetermined data items in a pull-down manner in a state of being selectable by the operating unit.

4. An OTU frame data generating apparatus according to claim 1, wherein, when an editing screen of "TTI" (Transmitted Trace Identifier) including access point information is specified as the predetermined data item by the operating unit, the editing unit causes to list-display on the display unit: (i) "SAPI" (Source Access Point Identifier) of 16 bytes relating to a source access point, (ii) "DAPI" (Destination Access Point Identifier) of 16 bytes relating to a destination point, (iii) data values currently set at the "SAPI" and the "DAPI", and (iv) arbitrary data of 32 bytes following the current data values set at the "SAPI" and the "DAPI", in order of the sequence numbers, and wherein the editing unit allows editing processing with respect to the "TTI" data by the operating unit, thereby causing to update corresponding data stored in the memory of the overhead data generating unit based on results of the editing processing.

5. An OTU frame data generating apparatus according to claim 4, wherein, when a display column "select", which is an item of "SAPI IS: CC (Country Code)" that designates a source access point country is selected on the editing screen of the "TTI", the editing unit causes to display on the display unit selectable items of "CC" in a pull-down manner.

6. An OTU frame data generating apparatus according to claim 2, wherein, when the editing screen of the "FTFL" is specified as the predetermined data item by the operating unit, the editing unit causes to list-display on the display unit one of an editing screen of "Forward field" of the "FTFL" and an editing screen of "Backward field" of the "FTFL" in a state of being selectable by an operation of the operating unit.

7. An OTU frame data generating apparatus according to claim 6, wherein, when the editing screen of "Forward field" of the "FTFL" is selected by the operating unit, the editing unit causes to list-display on the display unit respective items and data of: (i) "FIF (Fault Identifier Field)" in $0^{th}$ byte, (ii) "OIF (Operator Identifier Field)" in $1^{st}$ to $9^{th}$ bytes, and (iii) following data of 118 bytes in $10^{th}$ to $127^{th}$ bytes which can be arbitrarily set, in order of the sequence numbers, and wherein the editing unit allows editing processing with respect to the "FTFL" data by the operating unit, thereby causing to update corresponding data stored in the memory of the overhead data generating unit based on results of the editing processing.

8. An OTU frame data generating apparatus according to claim 1, wherein the editing unit causes to update corresponding data stored in the memory of the overhead data generating unit based on results of the editing processing carried out in each multiframe unit of the multiframe structured data.

9. An OTU frame data generating apparatus according to claim 1, wherein the overhead data generating unit includes an overhead memory which has stored the non-multiframe structured data to be inserted into the overhead portion of the OTU frame in advance.

10. An OTU frame data generating method for generating Optical Channel Transport Unit (OTU) frame data having an overhead portion into which multiframe structured data and non-multiframe structured data are mixed and inserted together, and a payload portion following the overhead portion, the method adapted to test transmitting equipment configuring an Optical Transport Network (OTN), the method comprising:

generating payload data to be inserted into the payload portion of an OTU frame;

successively outputting sequence numbers corresponding to the multiframe structured data among data to be inserted into the overhead portion of the OTU frame;

storing the non-multiframe structured data to be inserted into the overhead portion of the OTU frame in an overhead memory;

storing the multiframe structured data among the data to be inserted into the overhead portion of the OTU frame in a multidata memory in correspondence with the sequence numbers;

arbitrarily setting data of up to 256 frames for each predetermined data item as multiframe data, as an operation needed for editing of the multiframe structured data among the data to be inserted into the overhead portion of the OTU frame;

reading the multiframe structured data in correspondence with the sequence numbers from the multidata memory, in order of the sequence numbers, of up to 256 frames for a predetermined data item in accordance with the arbitrary setting and list-displaying the read data to a display unit;

carrying out editing processing in accordance with an operation of an operation unit, in a multiframe unit of the multiframe structured data and re-storing the multiframe structured data on which editing processing has been carried out in the multidata memory;

generating OTU frame data by inserting the multiframe structured data on which editing processing has been carried out, the non-multiframe structured data read from the overhead memory and the sequence numbers corresponding to the multiframe structured data into the overhead portion of the OTU frame, and by inserting the payload data into the payload portion of the OTU frame; and converting the generated OTU frame data into an optical signal and outputting the optical signal;

wherein, when an overhead portion editing mode is specified, the editing processing causes a basic screen to be displayed for editing of a layout of the overhead portion of 4×16 bytes which configures the overhead portion of the OTU frame, and on the basic screen, each of the predetermined data items to be inserted into the overhead portion of the OTU frame are displayed at positions corresponding to respective inserting positions; and wherein each of the predetermined data items of the multiframe structured data are displayed at positions corresponding to respective inserting positions in a state of being selectable in accordance with an operation of the operation unit.

11. An OTU frame data generating method according to claim 10, wherein the editing processing comprises:

selecting a predetermined data item with the operation unit;

reading data of up to 256 frames of the selected predetermined data item for respective editing screens from among at least "TTI" (Transmitted Trace Identifier) including access point information, "FTFL" (Fault Type and Fault Location reporting channel) including field information, and "PSI" (Payload Structure Identifier) including structural information of the payload portion, from multimedia memory;

causing to list-display the selected read data on the display unit in order of the sequence numbers;

making editing processing with respect to the selected multiframe structured data by the operation unit; and causing to update corresponding data stored in the multidata memory based on results of the editing processing.

12. An OTU frame data generating method according to claim 11, wherein, in a state in which the respective editing screens of the predetermined data items have been displayed, the editing processing causes detailed information to be displayed in the respective editing screens of the predetermined data items in a pull-down manner in a state of being selectable.

13. An OTU frame data generating method according to claim 10, wherein, when an editing screen of "TTI" (Transmitted Trace Identifier) including access point information is specified as the predetermined data item, the editing processing causes to list-display: (i) "SAPI" (Source Access Point Identifier) of 16 bytes relating to a source access point, (ii) "DAPI" (Destination Access Point Identifier) of 16 bytes relating to a destination point, (iii) data values currently set at the "SAPI" and the "DAPI", and (iv) arbitrary data of 32 bytes following the current data values set at the "SAPI" and the "DAPI", in order of the sequence numbers, and allows editing processing with respect to the "TTI" data, thereby causing to update corresponding data stored in the multidata memory based on results of the editing processing.

14. An OTU frame data generating method according to claim 13, wherein, when "select" in an item of "SAPI IS: CC (Country Code)", is selected on the editing screen of the "TTI", the editing processing causes to display selectable items of "CC" in a pull-down manner.

15. An OTU frame data generating method according to claim 11, wherein, when the editing screen of the "FTFL" is specified as the predetermined data item, the editing processing causes to display one of an editing screen of "Forward field" of the "FTFL" and an editing screen of "Backward field" of the "FTFL" in a state of being selectable.

16. An OTU frame data generating method according to claim 15, wherein, when the editing screen of "Forward field" of the "FTFL" is selected, the editing processing causes to list-display respective items and data of: (i) "FIF (Fault Identifier Field)" in $0^{th}$ byte, (ii) "OIF (Operator Identifier Field)" in $1^{st}$ to $9^{th}$ bytes, or the like, and (iii) following data of 118 bytes in $10^{th}$ to $127^{th}$ bytes which can be arbitrarily set in order of the sequence numbers, and allows editing processing with respect to the "FTFL" data, thereby causing to update corresponding data stored in the memory based on results of the editing processing.

17. An OTU frame data generating method according to claim 10, wherein the editing processing causes to update corresponding data stored in the memory based on results of the editing processing carried out in each multiframe unit of the multiframe structured data.

18. An OTU frame data generating method according to claim 10, wherein the storing of the non-multiframe structured data is carried out by storing the non-multiframe structured data in advance in the overhead memory.

19. An OTU frame data generating method according to claim 15, wherein, when the editing screen of "Backward field" of the "FTFL" is selected, the editing processing causes to list-display respective items and data of: (i) "FIF (Fault Identifier Field)" in $128^{th}$ byte, (ii) "OIF (Operator Identifier Field)" in $129^{th}$ to $137^{th}$ bytes, and (iii) following data of 118 bytes in $138^{th}$ to $255^{th}$ bytes which can be arbitrarily set in order of the sequence numbers, and allows editing processing with respect to the "FTFL" data, thereby causing to update corresponding data stored in the memory based on results of the editing processing.

20. An OTU frame data generating apparatus according to claim 6, wherein, when the editing screen of "Backward field" of the "FTFL" is selected by the operating unit, the editing unit causes to list-display on the display unit respective items and data of: (i) "FIF (Fault Identifier Field)" in $128^{th}$ byte, (ii) "OIF (Operator Identifier Field)" in $129^{th}$ to $137^{th}$ bytes, and (iii) following data of 118 bytes in $138^{th}$ to $255^{th}$ bytes which can be arbitrarily set, in order of the sequence numbers, and the editing unit allows editing processing with respect to the "FTFL" data by the operating unit, thereby causing to update corresponding data stored in the memory of the overhead data generating unit based on results of the editing processing.

* * * * *